(12) United States Patent (10) Patent No.: US 8,061,945 B2
Smith (45) Date of Patent: Nov. 22, 2011

(54) QUICK-ACTING THREADED FASTENER

(75) Inventor: Dwight Smith, Bedford, VA (US)

(73) Assignee: ZipNut Technology, LLC, Falls Church, VA (US)

( * ) Notice: Subject to any disclaimer, the term of this patent is extended or adjusted under 35 U.S.C. 154(b) by 296 days.

(21) Appl. No.: 12/465,181

(22) Filed: May 13, 2009

(65) Prior Publication Data

US 2010/0129178 A1 May 27, 2010

Related U.S. Application Data

(60) Provisional application No. 61/117,318, filed on Nov. 24, 2008.

(51) Int. Cl.
*F16B 39/28* (2006.01)
(52) U.S. Cl. ......................... 411/267; 411/433
(58) Field of Classification Search .......... 411/267, 411/431–434
See application file for complete search history.

(56) References Cited

U.S. PATENT DOCUMENTS

| | | | |
|---|---|---|---|
| 4,378,187 A | 3/1983 | Fullerton | |
| 5,139,381 A * | 8/1992 | Lubreski et al. | 411/433 |
| 5,324,150 A * | 6/1994 | Fullerton | 411/433 |
| 5,378,100 A | 1/1995 | Fullerton | |
| 5,427,488 A | 6/1995 | Fullerton et al. | |
| 5,580,200 A | 12/1996 | Fullerton | |
| 5,613,816 A | 3/1997 | Cabahug | |
| 5,733,084 A | 3/1998 | Fullerton | |
| 5,788,443 A | 8/1998 | Cabahug | |
| 5,800,108 A | 9/1998 | Cabahug | |
| 5,902,085 A * | 5/1999 | Yuta | 411/433 |
| 6,406,240 B1 | 6/2002 | Potter | |
| 6,712,574 B1 * | 3/2004 | Roopnarine | 411/433 |
| 6,974,291 B2 * | 12/2005 | Li | 411/437 |
| 2007/0286702 A1 * | 12/2007 | Smith | 411/432 |
| 2009/0324364 A1 * | 12/2009 | Smith | 411/433 |
| 2010/0158635 A1 * | 6/2010 | Rodman | 411/432 |

* cited by examiner

*Primary Examiner* — Gary Estremsky
(74) *Attorney, Agent, or Firm* — Michael Best & Friedrich LLP

(57) ABSTRACT

A threaded fastener includes an outer body defining a cavity and a central axis extending through the cavity, and a plurality of threaded segments positioned substantially within the cavity. The plurality of threaded segments is movable relative to the outer body generally toward and away from the central axis. The threaded fastener also includes a cap positioned at least partially within the cavity to secure the plurality of threaded segments within the cavity. The cap includes a plurality of projections engaging the plurality of threaded segments and the outer body to inhibit relative rotation between the plurality of threaded segments and the outer body. The plurality of projections is formed as a single piece with the cap. The threaded fastener further includes a snap ring removably coupled to the outer body to secure the cap within the cavity.

11 Claims, 6 Drawing Sheets

QUICK-ACTING THREADED FASTENER

CROSS-REFERENCE TO RELATED APPLICATION

This application claims priority to U.S. Provisional Patent Application No. 61/117,318, filed Nov. 24, 2008, the entire contents of which are hereby incorporated by reference.

BACKGROUND

Embodiments of the invention generally relate to threaded fasteners and, more particularly, to quick-acting threaded fasteners.

Quick-acting threaded fasteners allow a user to quickly connect the threaded fasteners to threaded members (e.g., bolts) without rotating the fastener relative to the bolt. These fasteners typically include a plurality of threaded segments positioned within an outer body. When a bolt is inserted into the fastener, the threaded segments spread slightly radially apart, allowing the bolt to slide through the fastener. However, in order to remove the fastener from the bolt, either the fastener or the bolt must be rotated by a user. Such quick-acting fasteners also typically include small pins inserted through the outer body to prevent relative rotation between the threaded segments and the body. Properly aligning, inserting, and securing these pins within the body may be a cumbersome and time-consuming process, increasing the assembly time, and thereby cost, of each fastener.

SUMMARY

In one embodiment, the invention provides an outer body defining a cavity and a central axis extending through the cavity, and a plurality of threaded segments positioned substantially within the cavity. The plurality of threaded segments is movable relative to the outer body generally toward and away from the central axis. The threaded fastener also includes a cap positioned at least partially within the cavity to secure the plurality of threaded segments within the cavity. The cap includes a plurality of projections engaging the plurality of threaded segments and the outer body to inhibit relative rotation between the plurality of threaded segments and the outer body. The plurality of projections is formed as a single piece with the cap. The threaded fastener further includes a snap ring removably coupled to the outer body to secure the cap within the cavity.

In another embodiment, the invention provides a threaded fastener including an outer body defining a cavity and a central axis extending through the cavity. The outer body includes a plurality of projections extending generally toward the central axis. The plurality of projections is formed as a single piece with the outer body. The threaded fastener also includes a plurality of threaded segments positioned substantially within the cavity. The plurality of threaded segments is movable relative to the outer body generally toward and away from the central axis. The threaded fastener further includes a body ring positioned substantially within the cavity about the plurality of threaded segments. The body ring includes an inclined surface to help guide the plurality of threaded segments toward and away from the central axis. The threaded fastener also includes a cap coupled to the outer body to secure the plurality of threaded segments within the cavity.

In yet another embodiment, the invention provides a method of manufacturing a threaded fastener. The method includes machining an outer body and a cavity in the outer body. The outer body defines a central axis extending through the cavity. The method also includes inserting a plurality of threaded segments into the cavity of the outer body. The plurality of threaded segments is movable relative to the outer body generally toward and away from the central axis. The method further includes positioning a cap at least partially within the cavity of the outer body. The cap includes a plurality of projections engaging the plurality of threaded segments and the outer body to inhibit relative rotation between the plurality of threaded segments and the outer body. The plurality of projections is formed as a single piece with the cap. The method also includes coupling a snap ring to the outer body to secure the cap within the cavity.

In still another embodiment, the invention provides a method of manufacturing a threaded fastener. The method includes molding an outer body with a plurality of projections and a cavity in the outer body. The outer body defines a central axis extending through the cavity. The plurality of projections is molded as a single piece with the outer body and extends generally toward the central axis. The method also includes molding a plurality of projections as a single piece with the outer body. The plurality of projections extends generally toward the central axis. The method further includes inserting a body ring into the cavity of the outer body. The body ring includes an inclined surface. The method also includes inserting a plurality of threaded segments into the cavity of the outer body. The plurality of threaded segments is movable relative to the outer body generally toward and away from the central axis. A portion of each threaded segment engages the inclined surface of the body ring such that the body ring helps guide movement of the threaded segments. The method further includes coupling a cap to the outer body to secure the plurality of threaded segments within the cavity.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
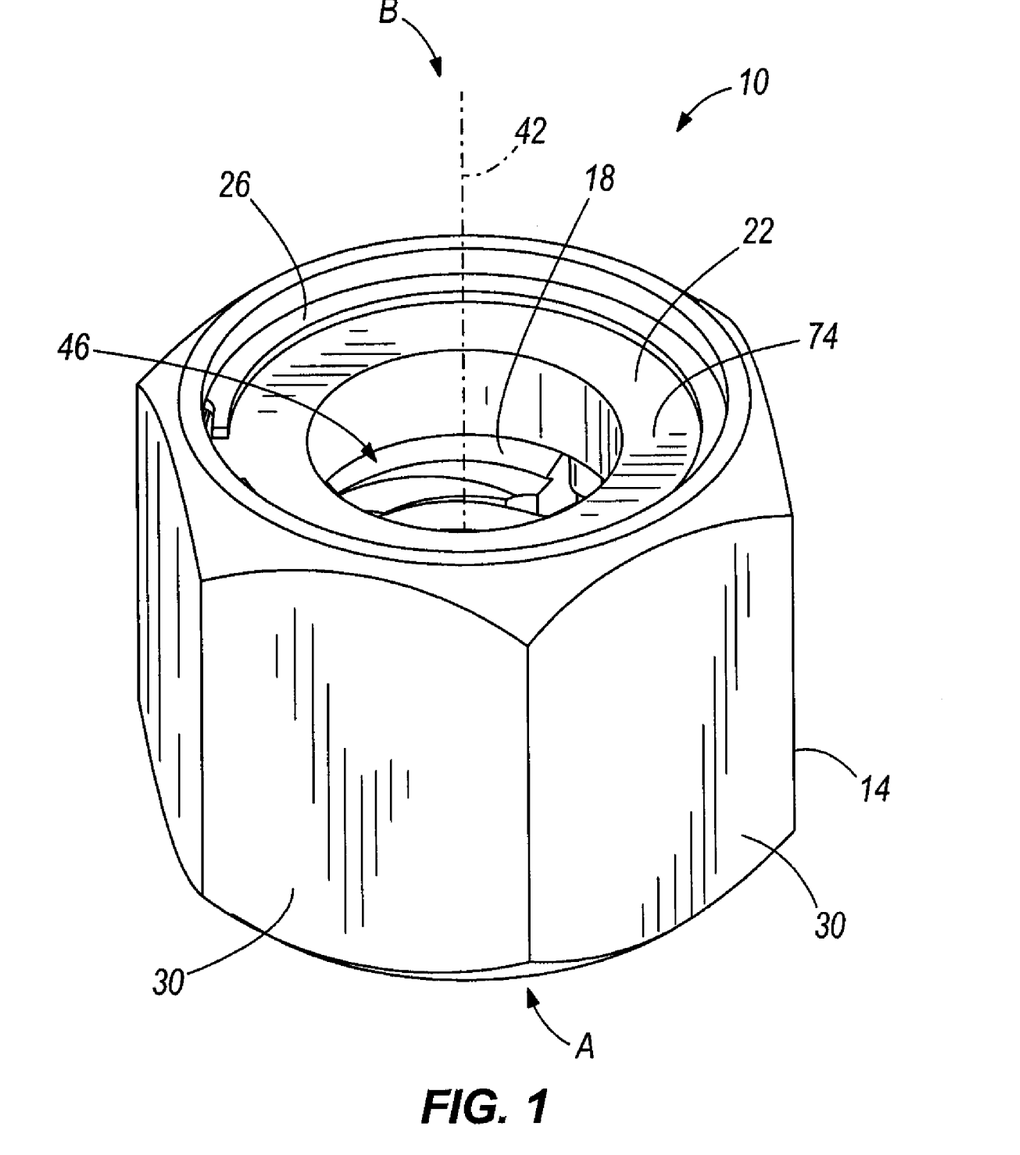
FIG. 1 is a perspective view of a threaded fastener embodying the invention.
Figure 2:
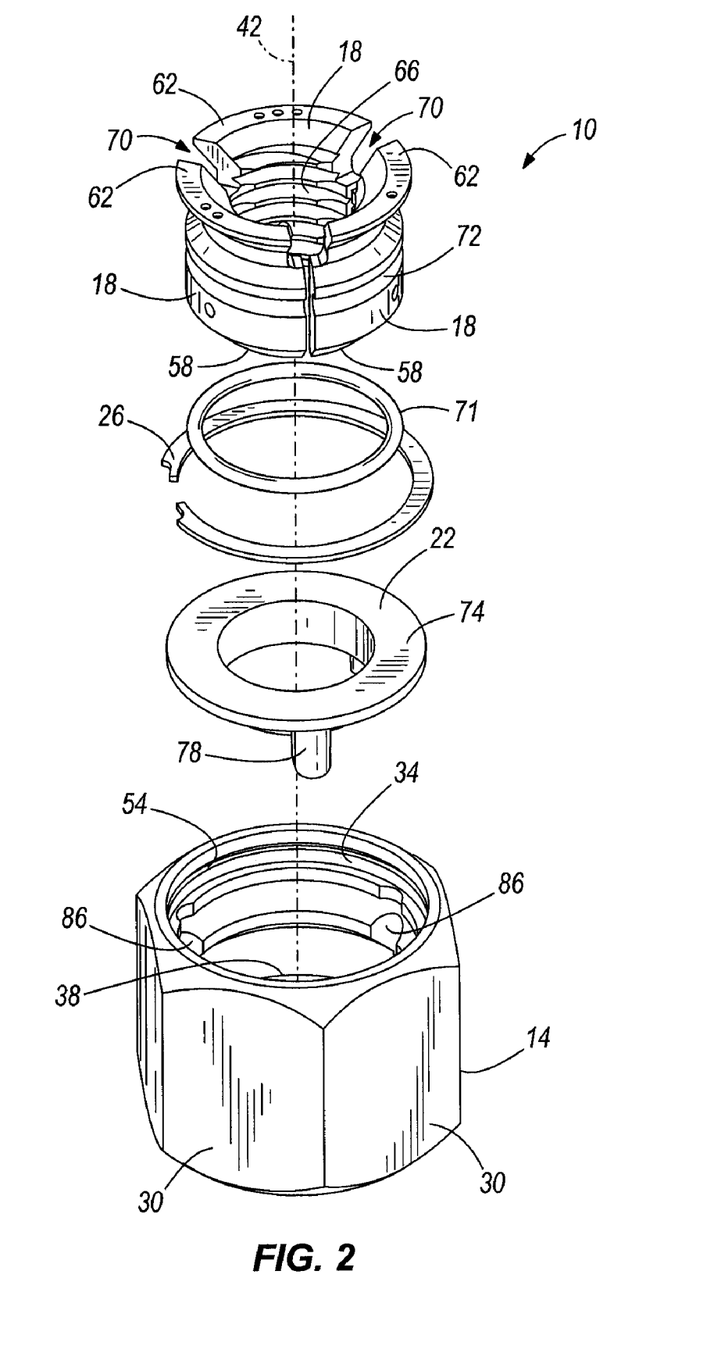
FIG. 2 is an exploded perspective view of the threaded fastener of FIG. 1.
Figure 3:
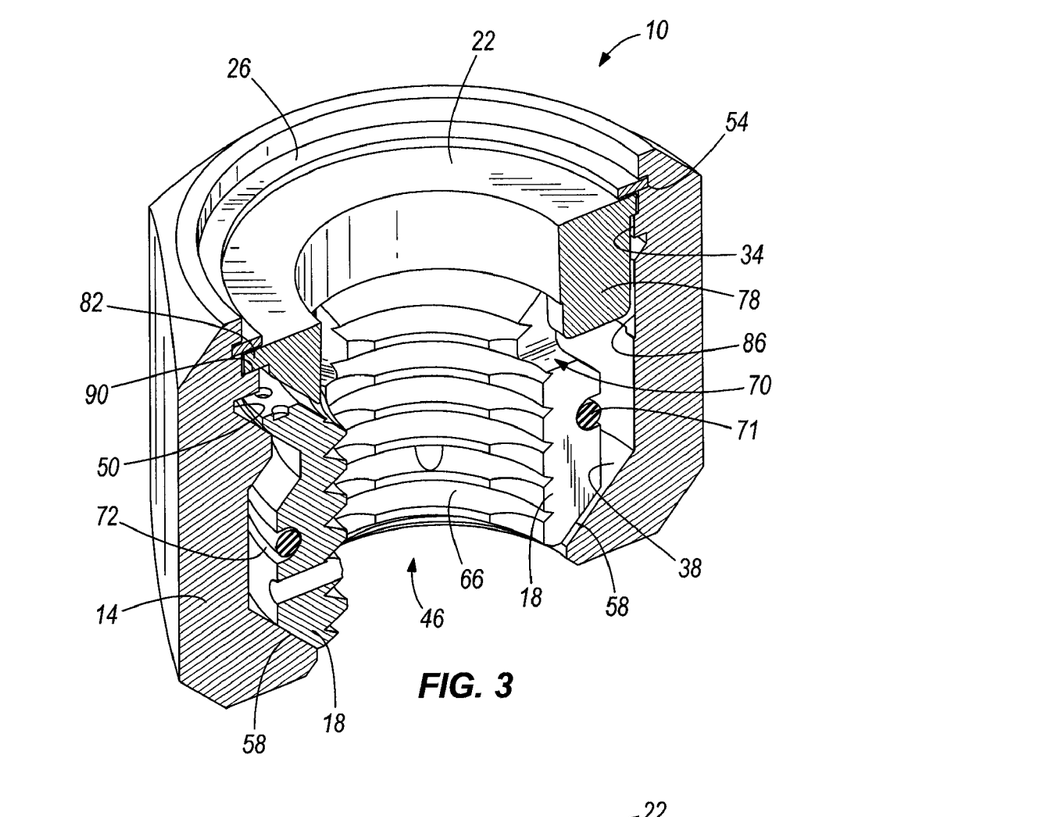
FIG. 3 is a cross-sectional view of the threaded fastener of FIG. 1.

FIGS. 1-3 illustrate a threaded fastener 10 embodying the invention. The illustrated threaded fastener 10, or nut, is a quick-acting threaded fastener. The threaded fastener 10 allows a user to quickly and efficiently couple the fastener 10 to a threaded member, such as a bolt, without rotating the fastener 10 relative to the member. The threaded fastener 10 is thereby suitable for applications where it is desired to assemble and secure a threaded connection quickly, such as, for example, when connecting a fire hose to a water line, when working underwater, when working in outer space, or the like. In order to remove the threaded fastener 10 from the threaded member, the user rotates the fastener 10 relative to the member, similar to a conventional nut.

As shown in FIGS. 1-3, the threaded fastener 10 includes an outer body 14, three threaded segments 18, a cap 22, and a snap ring 26. In the illustrated embodiment, the outer body 14 includes six flattened outer surface portions 30 such that the body 14 is generally hexagonally-shaped. In other embodiments, the outer body 14 may include fewer or more flattened outer surface portions 30 such that the body 14 is, for example, square-shaped, octagonally-shaped, cylindrically-shaped, or the like. Additionally or alternatively, the outer body 14 may include other surface features such as knurled surfaces, wings, and/or handles. The illustrated outer body 14 may be composed of a metal or metal alloy (e.g., aluminum, steel, stainless steel, nickel, etc.), a polymeric or composite material (e.g., high density polyethylene, etc.), or a combination of materials.

As shown in FIGS. 2 and 3, the outer body 14 includes an inner surface having a cylindrical portion 34 and a conical, or inclined, portion 38. The cylindrical portion 34 is generally parallel to a central axis 42 extending through the fastener 10, while the inclined portion 38 is formed at a non-perpendicular, non-parallel angle relative to the central axis 42. The inner surface portions 34, 38 define a central cavity 46 extending through the body 14 to receive, for example, a bolt or other threaded member. The cylindrical portion 34 also includes a first groove 50 and a second groove 54 for receiving portions of the threaded segments 18 and a portion of the snap ring 26, respectively, as further discussed below.

The threaded segments 18 are positioned substantially within the outer body 14 adjacent to the inner surface portions 34, 38. In the illustrated embodiment, the fastener 10 includes three threaded segments 18. In other embodiments, the fastener 10 may include fewer or more threaded segments 18. Similar to the outer body 14, the threaded segments 18 may be composed of a metal or metal alloy, a composite material, or a combination of materials. Each threaded segment 18 includes an inclined surface 58 corresponding to the inclined portion 38 of the outer body 14, a flange 62 positioned partially within the first groove 50 of the outer body 14, and a threaded surface 66. The threaded surface 66 is configured to engage corresponding threads on, for example, a bolt to secure the threaded fastener 10 to the bolt. Cutaway portions are also formed on each side of the flanges 62 to help define a gap 70 between adjacent threaded segments 18. In some embodiments, an elastomeric band or member 71 (e.g., a garter spring) may be positioned within an outer groove 72 formed in each threaded segment 18 to bias the threaded segments 18 toward the central axis 42, increasing the strength of engagement between the threaded surfaces 66 and a corresponding threaded member.

Figure 4:
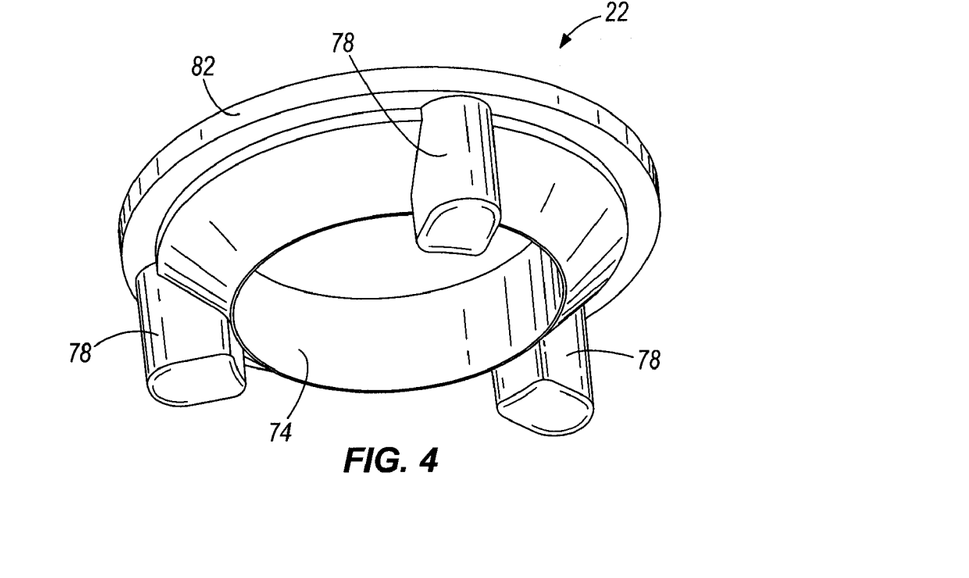
FIG. 4 is a bottom perspective view of a cap for use with the threaded fastener of FIG. 1.

As shown in FIGS. 2 and 4, the cap 22 includes a conically-shaped hub 74, three projections 78, and a lip 82 extending radially outwardly from the hub 74. Similar to the outer body 14, the cap 22 may be composed of a metal or metal alloy, a composite material, or a combination of materials. The illustrated projections 78 are integrally formed as a single piece with the hub 74 and extend axially from the hub 74. The projections 78 fit within the gaps 70 between adjacent threaded segments 18 and within corresponding recesses 86 in the cylindrical portion 34 of the outer body 14 to inhibit rotation of the threaded segments 18 and the cap 22 relative to the body 14. In the illustrated embodiment, the cap 22 includes three projections 78 corresponding to the three gaps 70 between the threaded segments 18. In other embodiments, the cap 22 may include fewer or more projections 78 to match the number of threaded segments 18. The lip 82 engages a shoulder 90 formed on the cylindrical portion 34 of the body 14 to inhibit axial movement of the cap 22 toward the threaded segments 18.

The illustrated projections 78 are positioned between the threaded segments 18, as opposed to inline with the segments 18, such that the segments 18 are thicker, stronger, and easier to assemble in relatively small outer bodies. Positioning the projections 78 between the threaded segments 18 also increases the manufacturing tolerances of the segments 18 and the outer body 14.

As shown in FIGS. 1-3, the snap ring 26 is an annular member configured to fit partially within the second groove 54 formed in the outer body 14. The snap ring 26 releasably secures the cap 22 within the outer body 14 to inhibit the cap 22, and thereby the threaded segments 18, from falling out of the body 14. The snap ring 26 allows for quicker assembly of the threaded fastener 10, reducing the overall manufacturing time of the fastener 10. In the illustrated embodiment, the snap ring 26 is removable from the second groove 54 to facilitate removal and/or replacement of the threaded segments 18 if, for example, one or more of the segments 18 becomes stripped or otherwise damaged. Removing the snap ring 26 also facilitates cleaning, lubricating, or otherwise servicing the fastener 10.

To manufacture and assemble the threaded fastener 10, the outer body 14 is machined using, for example, a lathe. In other embodiments, the outer body 14 may be injection molded. The threaded segments 18 are inserted into the cavity 46 in the body 14 such that the inclined surfaces 58 engage the conical portion 38 of the body 14 and the flanges 62 fit at least partially within the first groove 50 in the body 14. In some embodiments, the biasing member 71 may be positioned within the grooves 72 formed in the threaded segments 18 before the segments 18 are positioned in the cavity 46 so that the threaded segments 18 and the biasing member 71 are inserted into the outer body 14 as a single assembly. Once the threaded segments 18 are positioned within the outer body 14, the end cap 22 is aligned with the threaded segments 18 and inserted into the cavity 46 such that the projections 78 fit within the gaps 70 between adjacent threaded segments 18. The snap ring 26 is then positioned within the second groove 54 formed in the outer body 14 to secure the end cap 22 and the threaded segments 18 within the cavity 46.

When a bolt, or other threaded member, is inserted into the central cavity 46 of the threaded fastener 10 in a first direction A, threads on the bolt contact the threaded surfaces 66 of the threaded segments 18, pushing the threaded segments 18 toward the cap 22. As the threaded segments 18 move toward the cap 22, the segments 18 ride against the inclined portion 38 of the outer body 14, allowing the segments 18 to spread radially apart. The bolt thereby passes through and is coupled to the threaded fastener 10 without requiring a user to rotate the fastener 10 relative to the bolt.

If a user tries to pull the bolt out of the threaded fastener 10 in a second, opposite direction B, the threads on the bolt contact the threaded surfaces 66 of the threaded segments 18, pushing the segments 18 away from the cap 22. In such a condition, the threaded segments 18 ride along the inclined portion 38 of the outer body 14 to tighten around the bolt, inhibiting relative axial movement between the fastener 10 and the bolt. Therefore, in order to remove the bolt in the second direction B, a user rotates the bolt relative to the fastener 10, or vice versa. As the bolt is rotated, the projections 78 of the cap 22 engage the threaded segments 18 to inhibit relative rotation between the segments 18 and the outer body 14. Continued rotation unthreads the bolt from the threaded segments 18 to uncouple the bolt from the fastener 10.

Figure 5:
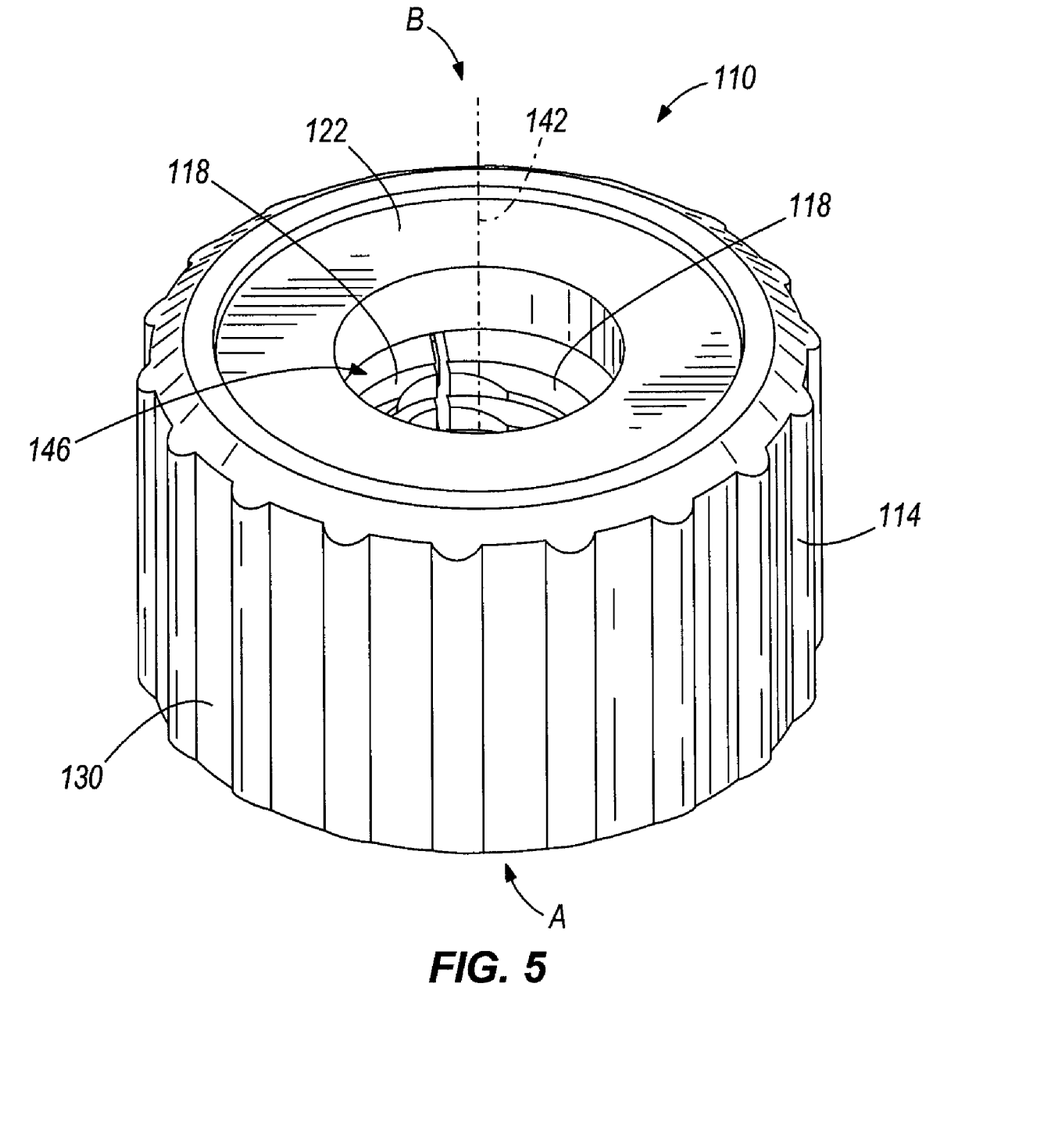
FIG. 5 is a perspective view of a threaded fastener according to another embodiment of the invention.
Figure 6:
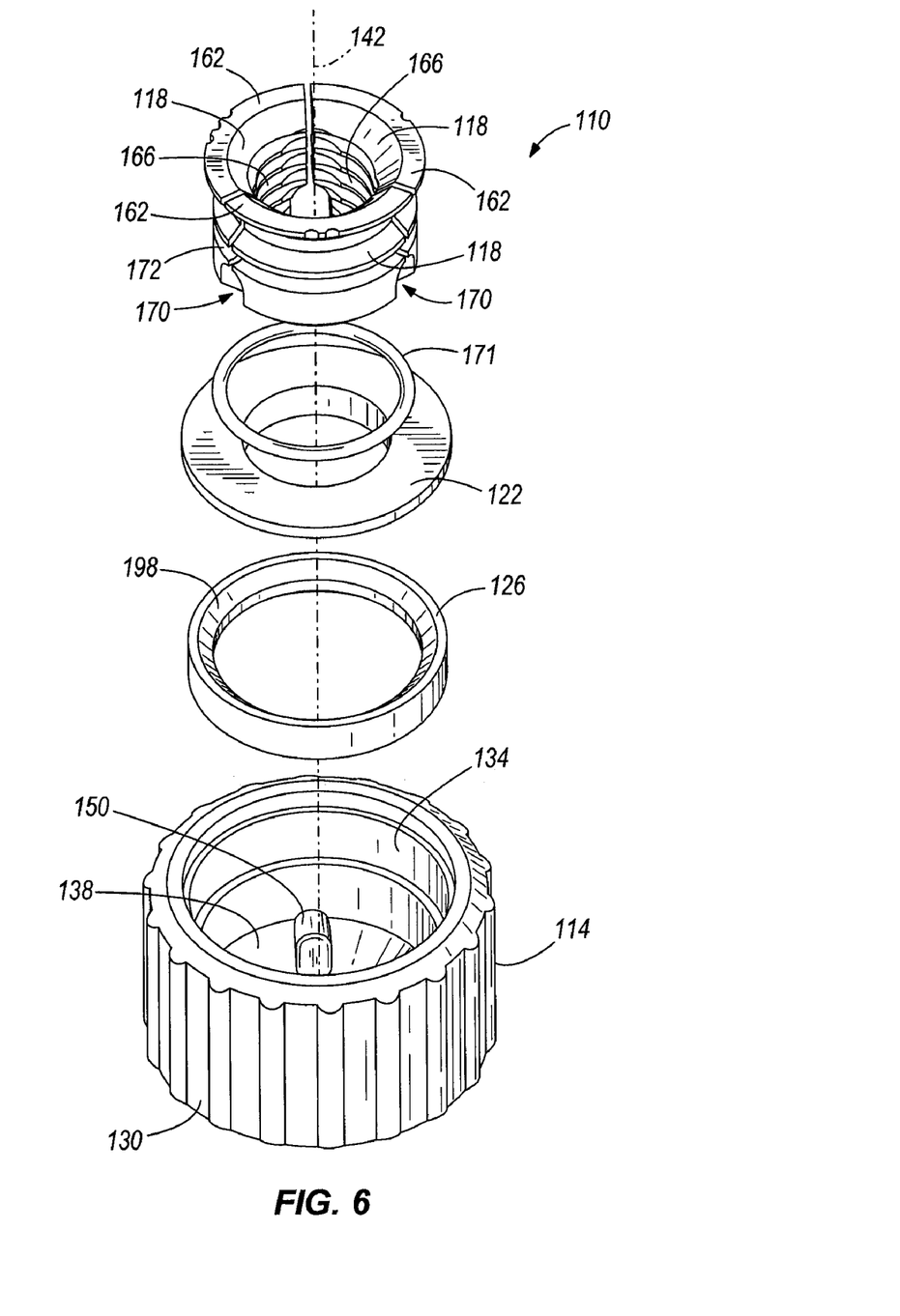
FIG. 6 is an exploded perspective view of the threaded fastener of FIG. 5.
Figure 7:
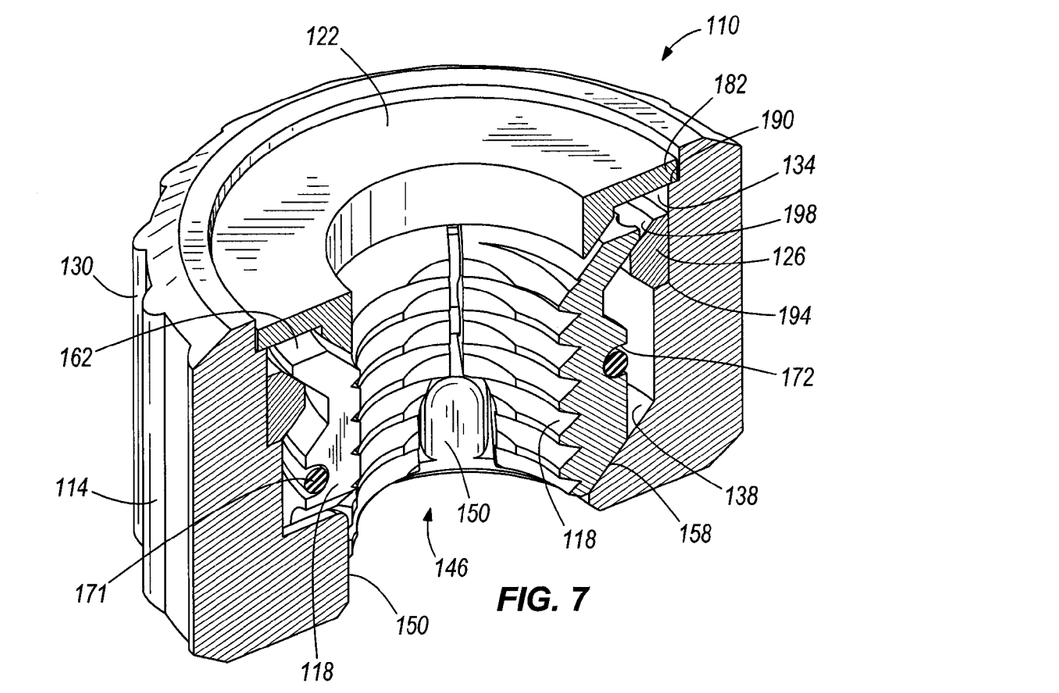
FIG. 7 is a cross-sectional view of the threaded fastener of FIG. 5.

FIGS. 5-7 illustrate a threaded fastener 110 according to another embodiment of the invention. The illustrated threaded fastener 110 is similar to the threaded fastener 10 discussed above with reference to FIGS. 1-4. Reference is hereby made to the description of the threaded fastener 10 for explanation of features and elements of the threaded fastener 110 not specifically discussed below.

The illustrated threaded fastener 110 includes an outer body 114, three threaded segments 118, a cap 122, and a body ring 126. In the illustrated embodiment, the outer body 114 is generally cylindrically-shaped and includes a knurled outer surface 130. In other embodiments, the outer body 114 may include flattened outer surface portions, wings, handles, or the like. In addition, the outer body 114 may be molded from a polymeric or composite material (e.g., high density polyethylene, high-strength reinforced plastic resins, etc.) or may be machined or die cast from a metal or metal alloy (e.g., aluminum, steel, stainless steel, nickel, etc.). Forming the threaded fastener 110 of a polymeric material allows the fastener 110 to be used in corrosive environments, such as during undersea oil explorations.

Figure 8:
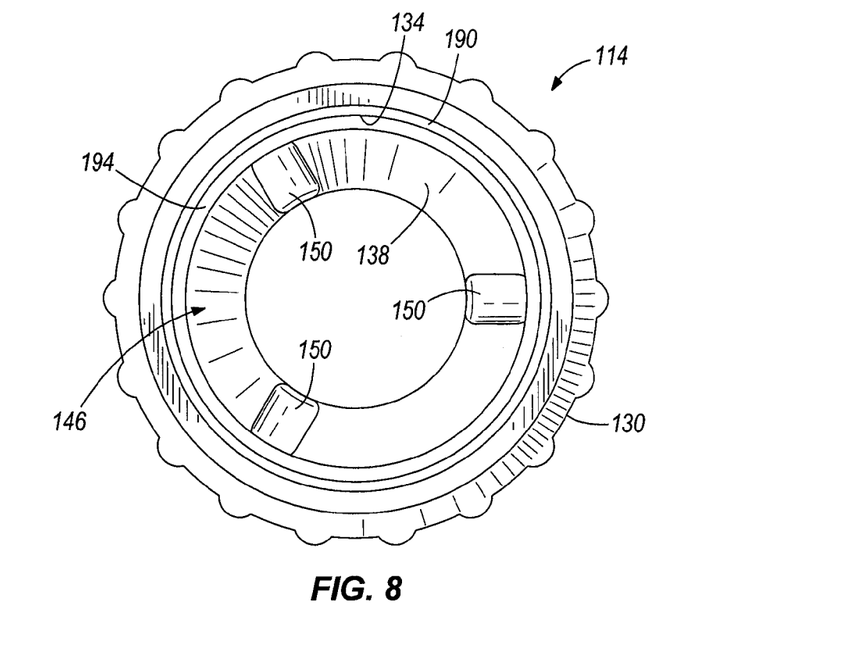
FIG. 8 is a top view of an outer body for use with the threaded fastener of FIG. 5.

As shown in FIGS. 6-8, the outer body 114 includes an inner surface having a cylindrical portion 134 and a conical, or inclined, portion 138. The cylindrical portion 134 is generally parallel to a central axis 142 extending through the fastener 110, while the inclined portion 138 is formed at a non-perpendicular, non-parallel angle relative to the central axis 142. The inner surface portions 134, 138 define a central cavity 146 extending through the body 114 to receive, for example, a bolt or other threaded fastener.

The outer body 114 also includes three projections 150 formed on the inclined portion 138. The illustrated projections 150 are integrally formed as a single piece with the outer body 114 and extend axially from the inclined portion 138. The projections 150 fit between adjacent threaded segments 118 to inhibit rotation of the threaded segments 118 relative to the body 114. In the illustrated embodiment, the outer body 114 includes three projections 150 corresponding to the three threaded segments 118. In other embodiments, the outer body 114 may include fewer or more projections 150.

As shown in FIGS. 6 and 7, the threaded segments 118 are positioned substantially within the outer body 114 adjacent to the inner surface portions 134, 138. In the illustrated embodiment, the fastener 110 includes three threaded segments 118. In other embodiments, the fastener 110 may include fewer or more threaded segments 118. Each threaded segment 118 includes an inclined surface 158 corresponding to the inclined portion 138 of the outer body 114, a flange 162 engaging the body ring 126, and a threaded surface 166. The threaded surface 166 is configured to engage corresponding threads on, for example, a bolt to secure the threaded fastener 110 to the bolt. Cutaway portions are also formed on each side of the inclined surfaces 158 to help define a gap 170 between adjacent threaded segments 118. The gaps 170 receive the projections 150 of the outer body 114 to inhibit relative rotation between the threaded segments 118 and the body 114. In some embodiments, an elastomeric band or member 171 (e.g., a garter spring) may be positioned within an outer groove 172 formed in each threaded segment 118 to bias the threaded segments 118 toward the central axis 142, increasing the strength of engagement between the threaded surfaces 166 and a corresponding threaded member The illustrated cap 122 is generally conically-shaped and includes a lip 182 extending radially outwardly therefrom. The lip 182 engages a shoulder 190 formed on the cylindrical portion 134 of the body 114 to inhibit axial movement of the cap 122 toward the threaded segments 118. In addition, the cap 122 is permanently fixed to the outer body 114 by, for example, a high strength solvent bond adhesive, ultrasonic welding, or the like to inhibit rotation of the cap 122 relative to the body 114.

The body ring 126 is positioned substantially within the outer body 114 about the flanges 162 of the threaded segments 118. In the illustrated embodiment, the body ring 126 is press fit against the cylindrical portion 134 of the body 114 adjacent to a shoulder 194. The body ring 126 includes an inclined surface 198 similar to the inclined portion 138 of the body 114 to help support and guide the threaded segments 118 as the segments 118 move radially inward and outward.

To manufacture and assemble the threaded fastener 110, the outer body 114 is formed by, for example, injection molding. In other embodiments, the outer body 114 may be machined. The body ring 126 is inserted into the cavity 146 in the body 114 to engage the shoulder 194 formed on the inner surface of the body 114. The threaded segments 118 are then inserted into the cavity 146 such that the inclined surfaces 158 engage the conical portion 138 of the body 14 and the flanges 162 engage the inclined surface 198 of the body ring 126. In addition, the threaded segments 118 are aligned with the outer body 114 such that the projections 150 formed on the inner surface of the outer body 114 fit within the gaps 170 between adjacent threaded segments 118. In some embodiments, the biasing member 171 may be positioned within the grooves 172 formed in the threaded segments 118 before the segments 118 are positioned in the cavity 146 so that the threaded segments 118 and the biasing member 171 are inserted into the outer body 114 as a single assembly. Once the threaded segments 118 are positioned within the outer body 114, the end cap 122 is inserted into the cavity 146 and coupled to the outer body 114 by, for example, ultrasonic welding, adhesives, or the like, to secure the threaded segments 118 within the cavity 146.

When a bolt, or other threaded member, is inserted into the central cavity 146 of the threaded fastener 110 in a first direction A, threads on the bolt contact the threaded surfaces 166 of the threaded segments 118, pushing the threaded segments 118 toward the cap 122. As the threaded segments 118 move toward the cap 122, the segments 118 ride against the inclined portion 138 of the outer body 114, allowing the segments 118 to spread radially apart. The bolt thereby passes through and is coupled to the threaded fastener 110 without requiring a user to rotate the fastener 110 relative to the bolt.

If a user tries to pull the bolt out of the threaded fastener 110 in a second, opposite direction B, the threads on the bolt contact the threaded surfaces 166 of the threaded segments 118, pushing the segments 118 away from the cap 122. In such a condition, the threaded segments 118 ride along the inclined portion 138 of the outer body 114 to tighten around the bolt, inhibiting relative axial movement between the fastener 110 and the bolt. Therefore, in order to remove the bolt in the second direction B, a user rotates the bolt relative to the fastener 110, or vice versa. As the bolt is rotated, the projections 150 of the outer body 114 engage the threaded segments 118 to inhibit relative rotation between the segments 118 and the outer body 114. Continued rotation unthreads the bolt from the threaded segments 118 to uncouple the bolt from the fastener 110.

Although the invention has been described in detail with reference to certain preferred embodiments, variations and modifications exist within the scope and spirit of one or more independent aspects of the invention as described. Various features and advantages of the invention are set forth in the following claims.

The invention claimed is:

1. A threaded fastener comprising:
an outer body defining a cavity and a central axis extending through the cavity;
a plurality of threaded segments positioned substantially within the cavity, the plurality of threaded segments movable relative to the outer body generally toward and away from the central axis;
a cap positioned at least partially within the cavity to secure the plurality of threaded segments within the cavity, the cap including a plurality of projections engaging the plurality of threaded segments and the outer body to inhibit relative rotation between the plurality of threaded segments and the outer body, the plurality of projections being formed as a single piece with the cap; and
a snap ring removably coupled to the outer body to secure the cap within the cavity,
wherein the outer body includes an inner surface defining the cavity and a plurality of recesses formed in the inner surface, and wherein each of the plurality of projections engages a corresponding recess to inhibit rotation of the cap relative to the outer body.

2. The threaded fastener of claim 1, wherein the outer body includes an inner surface defining the cavity and a groove formed in the inner surface, and wherein at least a portion of the snap ring fits within the groove to couple the snap ring to the outer body.

3. The threaded fastener of claim 1, wherein each of the plurality of projections extends between two adjacent threaded segments to inhibit rotation of the plurality of threaded segments relative to the outer body.

4. The threaded fastener of claim 1, further comprising an elastomeric member extending about the plurality of threaded segments, wherein the elastomeric member biases the plurality of threaded segments toward the central axis.

5. The threaded fastener of claim 1, wherein the threaded fastener includes three threaded segments, and wherein the cap includes three projections.

6. The threaded fastener of claim 1, wherein the outer body includes a generally hexagonal outer surface.

7. The threaded fastener of claim 1, wherein the outer body includes a generally cylindrical outer surface.

8. A method of manufacturing a threaded fastener, the method comprising:
machining an outer body and a cavity in the outer body, the outer body defining a central axis extending through the cavity;
inserting a plurality of threaded segments into the cavity of the outer body, the plurality of threaded segments being movable relative to the outer body generally toward and away from the central axis;
positioning a cap at least partially within the cavity of the outer body, the cap including a plurality of projections engaging the plurality of threaded segments and the outer body to inhibit relative rotation between the plurality of threaded segments and the outer body, the plurality of projections being formed as a single piece with the cap; and
coupling a snap ring to the outer body to secure the cap within the cavity,
wherein the outer body includes an inner surface defining the cavity, further comprising machining a plurality of recesses in the inner surface, and wherein positioning the cap at least partially within the cavity includes inserting each of the plurality of projections into a corresponding recess to inhibit rotation of the cap relative to the outer body.

9. The method of claim 8, wherein the outer body includes an inner surface defining the cavity, further comprising machining a groove in the inner surface, and wherein coupling the snap ring to the outer body includes inserting at least a portion of the snap ring into the groove.

10. The method of claim 8, wherein positioning the cap at least partially within the cavity further includes inserting each of the plurality of projections between two adjacent threaded segments to inhibit rotation of the plurality of threaded segments relative to the outer body.

11. The method of claim 8, further comprising positioning an elastomeric member about the plurality of threaded segments, wherein the elastomeric member biases the plurality of threaded segments toward the central axis.

* * * * *